(12) United States Patent
Gurin et al.

(10) Patent No.: US 6,979,508 B2
(45) Date of Patent: Dec. 27, 2005

(54) FUEL CELL WITH INTEGRATED FEEDBACK CONTROL

(75) Inventors: Victor Gurin, Boca Raton, FL (US); Peter Novak, Fort Lauderdale, FL (US)

(73) Assignee: Ener 1 Inc., Fort Lauderdale, FL (US)

( * ) Notice: Subject to any disclaimer, the term of this patent is extended or adjusted under 35 U.S.C. 154(b) by 0 days.

(21) Appl. No.: 10/746,405

(22) Filed: Dec. 24, 2003

(65) Prior Publication Data

US 2005/0100777 A1 May 12, 2005

Related U.S. Application Data

(60) Provisional application No. 60/519,184, filed on Nov. 12, 2003.

(51) Int. Cl.[7] ............................ H01M 8/04; H01M 2/14
(52) U.S. Cl. ............................ 429/25; 429/38; 429/34; 429/19
(58) Field of Search ........................ 429/19, 17, 25, 429/30, 34, 38, 26, 22, 20, 21; 137/14, 102, 137/487.5, 613

(56) References Cited

U.S. PATENT DOCUMENTS

| | | | |
|---|---|---|---|
| 5,547,776 A | | 8/1996 | Fletcher et al. |
| 5,595,833 A | * | 1/1997 | Gardner et al. ............... 429/19 |
| 5,914,200 A | * | 6/1999 | Schabert et al. ............... 429/34 |
| 6,093,502 A | * | 7/2000 | Carlstrom et al. ............ 429/25 |
| 6,500,319 B2 | | 12/2002 | LaConti et al. |
| 6,566,003 B2 | | 5/2003 | Acker |
| 6,699,610 B2 | | 3/2004 | Yang |
| 2001/0014415 A1 | * | 8/2001 | Iio et al. ....................... 429/22 |
| 2003/0035986 A1 | * | 2/2003 | Yang ............................ 429/25 |
| 2004/0197614 A1 | * | 10/2004 | Simpson et al. .............. 429/17 |

* cited by examiner

*Primary Examiner*—Raymond Alejandro (57) ABSTRACT

A recirculating reagent fuel-cell includes an ion-exchange membrane interposed between an anode and cathode anode to form a membrane/electrode assembly (MEA), the MEA interposed between a fuel gas diffusion layer and an oxidant gas diffusion layer. An oxidant and fuel flow network are provided having an input portion for supplying reagent and an output portion for removing reagent after electrochemical reaction. At least one of the oxidant flow network and fuel flow network includes a recirculation loop, the recirculation loop feeding back a portion of the fuel or oxidant after electrochemical reaction to their respective input portion. The fuel flow network can include a water vapor condenser to extract water from the cathodes in proportion to the external load on the fuel cell stack and the fuel flow network can include an evaporator, where water is fed to the evaporator in the fuel loop from the condenser in the oxidant feed loop.

8 Claims, 6 Drawing Sheets

System 100

FUEL CELL WITH INTEGRATED FEEDBACK CONTROL

CROSS-REFERENCE TO RELATED APPLICATIONS

This application claims the benefit of U.S. Provisional Application Ser. No. 60/519,184 entitled "HYDROGEN-AIR ELECTROCHEMICAL GENERATOR BASED ON FUEL CELLS WITH SOLID-POLYMER ELECTROLYTE" filed on Nov. 12, 2003, the entirety of which is incorporated herein by reference.

STATEMENT REGARDING FEDERALLY SPONSORED RESEARCH OR DEVELOPMENT

Not applicable.

FIELD OF THE INVENTION

This invention relates to fuel cell assemblies and, more particularly to fuel cells having integrated feedback for regulation of water as well as fuel and oxidant supplied thereto.

BACKGROUND OF THE INVENTION

Fuel cells hold great promise for commercial use in mobile and stationary power supply systems. Fuel cells electrochemically convert fuels and oxidants to electricity. Fuel cell types include Alkaline Fuel Cells (AFC), Molten Carbonate Fuel Cells (MCFC), Phosphoric Acid Fuel Cells (PAFC), Proton Exchange Membrane Fuel Cells (PEMFC or PEM), Solid Oxide Fuel Cells (SOFC) and Direct Methanol Fuel Cells.

There has been significant progress in the development of fuel cells, including improvements in specific characteristics, such as increased power density and increased efficiency. Nonetheless, the wide variations in load demand encountered in most commercial applications remain a problem for fuel cell based electrochemical generators, particularly for those that use solid polymer electrolytes, such as PEMs.

A PEM fuel cell converts the chemical energy of fuels such as hydrogen and an oxygen containing gas (e.g. air) directly into electrical energy, water and heat. At the heart of a PEM fuel cell is a membrane electrode assembly (MEA) comprising a proton conducting membrane electrolyte sandwiched between two gas diffusion electrodes. The membrane permits the passage of protons (H+) generated by oxidation of hydrogen gas at the anode to reach the cathode side of the fuel cell and form water, while preventing passage therethrough of either of the reactant gases.

Efficient operation of PEM fuel cells generally requires the removal of a portion of the water produced. Excess water can dilute the electrolyte, making it difficult to maintain optimum electrolyte concentrations under wide ranging of current loads. Load demands faced by a system in a typical commercial use might vary from 0 to 1000 ma/cm$^2$ under a typical load cycle.

For the optimum operation of such fuel cells, the membrane should remain sufficiently moist throughout, but not too moist. Thus, there must be removal of a portion of the water generated at the cathode, as well as the addition of water at the anode side to provide sufficient membrane moistness.

Several characteristics of PEM fuel cells separate them from other types of fuel cells. For example, in contrast to other fuel cell types, PEM fuel cells have a narrow range for controlling optimal concentration of electrolyte in the localized zone of electrochemical activity comprising the anode, membrane and cathode. Such membranes have a limited ability for redistribution of water over the fuel cell working surface area. This performance characteristic of fuel cells with PEMs is attributed to the reduced ability of the anode, cathode and membrane (as a group) to transport water, and to the hydrophobic characteristics of the materials used.

These characteristics of solid-polymer membranes become critical when designing and using fuel cells with large working surface areas to produce large currents, such as required for transportation applications (e.g. automobiles, and busses), especially when a large number of fuel cells are combined in series to generate high voltage outputs. For example, to build an electrochemical generator having a capacity of 25 kW at a voltage of 120V, a stack comprising 160 fuel cells is required with a working surface area of approximately 600 cm$^2$ each. In a generator with a power rating of 60 kW and a 330V output, it is necessary to install 420 fuel cell elements with a working surface area of 740 cm$^2$ each, connected in series.

Maintaining the high output characteristics of fuel cells assembled into stacks to form electrochemical generators is one of the challenges of electrochemical generator design. In the case of fuel cells with solid-polymer membranes this task is even more difficult. The very narrow range over which water concentration must be controlled imposes strict requirements on the systems that feed the working gases, as well as on regulation of water concentration and temperature of each individual fuel cell. In addition, even at low operating times (1000–2000 hrs), characteristics of the individual fuel cells in a stack do not change in a constant or even manner. Progressive and uneven degradation in performance among the cells demands even more strict requirements for control of fuel cells assembled into electrochemical generator systems.

In high power hydrogen-air electrochemical generators, hydrogen is supplied from storage tanks with high pressures up to 70 MPa. Systems for supplying gas usually have electric valves on hydrogen supply and purge lines. A hydrogen pressure regulator is commonly installed in the gas supply line upstream of the fuel cell stack. A feedback control pressure regulator is generally provided which senses variation in pressure at the fuel cell and control reactants gas flow in a manner proportional to gas usage. Control of gas flow and pressure (i.e. reduction of pressure from input pressure to working pressure) is also accomplished using a regulator.

For smoother and more precise throttle control, a two-stage pressure regulator system is usually installed. The pressure regulator reduces the working pressure of the fuel cell. For synchronization of hydrogen and air pressures in the fuel cell stack, a pressure reference line is installed in parallel to hydrogen supply line to provide a reference pressure to the regulator.

This reference line is static and does not consume hydrogen during fuel cell operation. It is filled with hydrogen during start-up and emptied (purged) when the fuel cell generator is stopped or stored. As a rule, a vent valve is installed in the reference line to restrict pressure, and an electrical valve is installed for reduction of pressure to atmospheric pressure.

The reference line can be filled with inert gas, if available. The oxidant feed line to the cathode pores in the fuel cell stack has a filter to remove particles and a compressor to built up air pressure to a working level. The partial pressure of oxygen in air is relatively low (about 21.6%), the largest portion of air being nitrogen. For the cathode to work effectively, air should be fed in excess. In this case, the efficiency of oxygen usage is 40%–60% as a rule. At higher rates of oxygen usage, the cathode is less efficient.

In current fuel cell stack designs, the air supply system maintains the design working pressure level on cathode and anode. For this purpose, the hydrogen pressure regulator has a feedback connection to the air supply line at the entry point to the fuel cell. In this case the hydrogen pressure in the anode chamber is constantly compared with the air pressure in the cathode chamber and the pressure regulator makes needed adjustments in order to maintain the correct pressure ratio.

The system described above for supplying hydrogen and air to fuel cells with solid-polymer electrolytes is essentially universal and used in almost all known designs with only minor variations. However, as explained below, these systems do not provide good regulation of the water concentration along the cathode and anode surface of the fuel cell stack, particularly for high and highly variable load conditions.

The power output of a hydrogen-air fuel cell mainly depends on effective performance of the cathodes (oxygen limited electrodes). At higher coefficient efficiency oxide-oxygen (CEUO), such as CEUO≧70%, stable fuel cell performance is generally not possible with current density $j \geq 0.5$ a/cm$^2$ because of low oxygen concentrations in air near the exhaust point from cathode chamber.

In this case, there are gas transport restrictions on the amount of oxygen penetrating through the cathode pores and available to the cathodes. Drying takes place in some areas of the cathodes because of low water (vapor) concentration in the air supplied by the compressor.

Moreover, compressed feed air at the outlet of the compressor can be at even higher temperatures (e.g. 130–170° C.). Thus, there is active removal of water (vapor) by the airflow which, in turn, leads to drying of the membrane in the air inlet region. In the air outlet area from the cathodes there occurs the reverse of this process leading to "flooding" of the cathode and membrane because air flowing in this area close to saturation and the rate of water uptake (vaporization) is lower.

Because of low oxygen concentrations in the air after passing through most of the cathode chamber and gas flow restrictions, a large portion of the cathode surface can be in a condition of "concentration polarization." Concentration polarization results from restrictions to the transport of the fuel gases to the reaction sites. This usually occurs at high current because the forming of product water and excess humidification blocks the reaction sites. In this situation, there is increased risk of cross polarization in area near the gas outlet from the cathode chamber. This risk becomes much greater when the fuel cell load is highly variable over short time periods. Specifically, the risk is greatest when loads are switched from low to high levels and back in short periods of time, such as tens of seconds to minutes.

Such short-term load variations are generally not allowed in fuel cell operation. Otherwise non-optimum water concentration at the cathode and membrane can lead to cross polarization. This can cause the cells to operate in an electrolysis mode, which in turn can lead to direct reaction between hydrogen and air in the cell resulting in physical damage to the fuel cell.

Solving the problem of controlling water concentrations in fuel cells will greatly expand their potential application. However, this does not solve the problem of the fuel cell's inability to withstand wide range, short-term variations in load because of high thermal inertia due to the heat capacity of the fuel cell stack and the heat exchanges. The primary unmet requirement for use of hydrogen-air fuel cells in transportation and many stationary power applications is that fuel cell generators must be highly reliable in the face of rapid and wide-range variations in load.

The above-mentioned issues represent a significant problem for electrochemical generators with solid polymer fuel cells as presently installed on electric vehicle prototypes. Currently available electrochemical generators do not meet consumer requirements in this regard, and therefore cannot be mass-produced and marketed for general use. This is not only because of the high cost and complexity of systems for controlling processes in fuel cells, but also because a primary application requirement cannot be met. This requirement is the ability to handle current loads that vary widely, and sometimes rapidly, for long-term operation (e.g. more than about 3000 hrs).

SUMMARY OF THE INVENTION

A recirculating reagent fuel-cell includes an ion-exchange membrane interposed between an anode and cathode to form a membrane/electrode assembly (MEA), the MEA interposed between a fuel gas diffusion layer and an oxidant gas diffusion layer. An oxidant and fuel flow network are provided having an input portion for supplying reagent and an output portion for removing reagent and reaction products after the electrochemical reaction. At least one of the oxidant flow network and fuel flow network includes a recirculation loop formed by a feedback conduit which provides fluid connection between the input and output portion. The recirculation loop feeds back a portion of the fuel or oxidant after electrochemical reaction to their respective input portion.

The recirculation loop can include a water containing volume, wherein a portion of the output flow flows through the water containing volume to generate a humidified flow, the humidified flow comprising a portion of the oxidant or the fuel flow supplied to the fuel cell. The volume of the humidified flow can be adjustable, with the humidified flow volume increasing with a load on the fuel cell.

At least one of the oxidant and fuel input portions can include a jet pump therein, where the jet pump induces recirculation in the recirculation loop. The output flow of the feedback conduit is preferably used as an input flow to the jet pump. In this embodiment, the jet pump mixes the portion of the fuel or oxidant flow fed back with externally supplied fuel or oxidant.

The water containing volume in the oxidant flow network can be a condenser for extracting water from the cathode, while the water containing volume in the fuel flow network can be an evaporator. In this embodiment, the condenser extracts water from the cathode in relation to a load on the fuel cell. The condenser is preferably fluidly connected to the evaporator, with the condenser supplying the fuel flow network with water.

The fuel cell can include a flow modulator fluidicly connected with at least one of an input portion the fuel flow network and an input portion of the oxidant flow network, wherein the flow modulator provides a time varying mass flow of fuel or oxidant. The modulator preferably includes structure for initiating operation across all fuel cell load conditions. The fuel flow network can include a first modulator and the oxidant flow network can includes a second modulator, the first and second modulator being communicably connected. The flow modulator preferably provides discrete pulses of fuel or oxidant flow, such as through use of a pressure sensor-controlled two-positional pressure regulator having only two positions, a first position being a fully open position and the other position being fully closed.

A method of operating a fuel cell includes the steps of providing a fuel flow to an anode of the fuel cell and an oxidant flow to a cathode of the fuel cell, wherein at least one of the fuel flow and the oxidant flow comprises a recirculated flow portion. The recirculated flow portion can be a humidified flow. The fuel flow and the oxidant flow can include a recirculated flow portion, wherein the method can include the step of transferring water generated at the cathode into the fuel recirculated portion to humidify the fuel flow.

At least one of the fuel flow and the oxidant flow can be a time varying mass flow, the mass flow varying with a load on the fuel cell. The time varying mass flow is preferably operative across all loads on the fuel cell and can comprise discrete pressure pulses. In a preferred embodiment, both the fuel flow and the oxidant flow are time varying mass flows, wherein the method can further comprise the step of time synchronizing the time varying mass flow of the fuel flow with the time varying mass flow of the oxidant flow.

BRIEF DESCRIPTION OF THE DRAWINGS

A fuller understanding of the present invention and the features and benefits thereof will be accompanied upon review of the following detailed description together with the accompanying drawings, in which.

DETAILED DESCRIPTION OF THE INVENTION

The invention is an electrochemical generator based on fuel cells, such as hydrogen-air fuel cells with solid polymer proton exchange membranes (PEM) that can be used in mobile or stationary applications. Generators based on the invention provide higher reliability and higher efficiency as compared to conventional fuel cells, particularly under rapid and widely varying power demands, such as those encountered for typical automotive applications.

A recirculating reagent fuel-cell includes an ion-exchange membrane interposed between an anode and cathode anode to form a membrane/electrode assembly (MEA), the MEA interposed between a fuel gas diffusion layer and an oxidant gas diffusion layer. An oxidant and fuel flow network are provided having an input portion for supplying reagent and an output portion for removing excess reagent and reaction byproducts after electrochemical reaction. At least one of the oxidant flow network and fuel flow network includes a feedback conduit to form a recirculation loop, the recirculation loop feeding back a portion of the fuel and/or oxidant after electrochemical reaction to their respective input portion.

The oxidant flow loop can include a water vapor condenser to extract water from the cathode chambers, the amount of water being based on the external load on the fuel cell stack. The fuel flow network can include an evaporator, where water is fed to the evaporator in the fuel loop from the condenser in the oxidant loop. In this embodiment, the portion of the output flow fed back to the input portion is a humidified flow.

The invention provides humidification and resulting membrane wetness which is based on the fuel cell load. If the load increases, the fuel cell generates more water, thus more water is collected in the condenser. Since the output flow portion flowing through the condenser increases as the load increases, the humidified flow output by the condenser increases as well based on the level of the load.

Although the invention is generally described with respect to a hydrogen-air electrochemical generator, the invention is in no way limited to either hydrogen or air. For example, the fuel can generally be any oxidizable gas, including mixtures thereof, while air can more generally be any oxidant gas. Moreover, recirculating reagent gas flow arrangements according to the invention described herein can be advantageously used with other types of fuel cells, particularly for membrane-based fuel cells. In addition, the aperiodic load based reagent flow supply feature described herein can be generally used with all fuels cell types, whether membrane based or not, and more generally, for chemically reactive systems.

Figure 1:
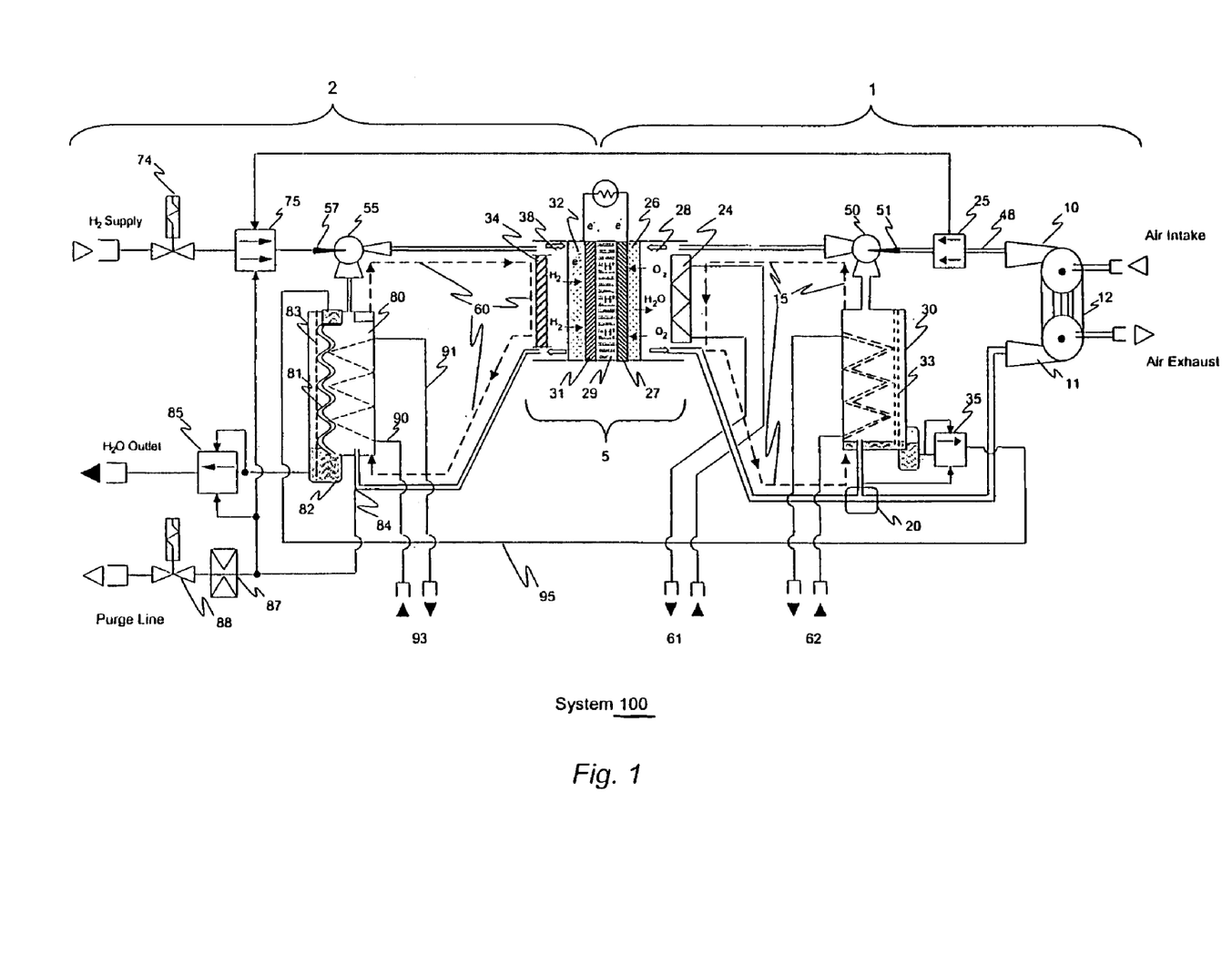
FIG. 1 is a schematic of a recirculating reagent fuel cell system having recirculation loops in both the anode and cathode side, according to an embodiment of the invention.

Referring to FIG. 1, a schematic of a recirculating reagent fuel cell system 100 according to an embodiment of the invention is shown. System 100 includes fuel cell 5, which includes ion-exchange membrane 29 interposed between an anode 31 and cathode 27 to form a membrane/electrode assembly (MEA). The MEA is interposed between porous oxidant gas diffusion layer 26 and porous fuel diffusion layer 32. Cathode chamber 28 is bounded by plate 24 which is disposed adjacent to oxidant gas diffusion layer 26, while anode chamber 38 bounded by flow plate 34 is disposed adjacent to fuel diffusion layer 32. The respective porous gas diffusion layer/electrode structures typically comprise a Pt electrocatalyst dispersed on high surface area carbon black, held together with a binding agents, such as polytetrafluoroethyene (PTFE) and NAFION®. In most practical electrical chemical generator applications, system 100 comprises a plurality of fuel cells 5 hooked in series to form a fuel cell stack. The fuel cell 5 arrangement described herein is not an aspect of the invention.

The reagent recirculation and control arrangement shown in both the cathode side 1 and anode side 2 are aspects of the invention. Cathode side 1 is provided an air supply, preferably cleaned of particles by suitable filtration, which is fed into a compressor 10, which provides the necessary flow and pressure of oxidant (e.g. air) for cathode side 1 of fuel cell 5 to support the electrochemical reaction. Both an electric motor 12 and an expander 11 are preferably used to drive compressor 10. Expander 11 utilizes energy from a hot pressurized oxidant output flow after electrochemical reaction.

Compressor 10 is in fluid communication with pressure regulator relay 25 via line 48. Regulator 25 is preferably of the type "pressure sensor–controlled two-positional pressure regulator". This preferred type of regulator provides discrete constant pressure pulses of gas flow which have a pulse period and duty cycle (the % of the period in which the regulator is open) in relation to the external load and the gas consumption of the electrochemical reaction, which is generally variable over time, and may be highly variable. Regulator 25 senses pressure in the output portion of the oxidant flow network and is communicably connected to regulator 75 on the anode side 2.

When the fuel cell 5 is operating in an idling mode, with external loads disconnected, compressor 10 in the cathode side 1 and the compressor (if present) in the anode side 2 is preferably left running. This condition allows fast re-connection to external load, because when fuel cells are operated at the lower loads, the process of hydrogen and oxygen supply does not stop and can be rapidly increased as needed after re-connecting the external load.

To increase the supply of oxidant gas to the cathode side of fuel cell 5 without the need for additional air intake into system 100, and for extraction of water and depleted oxidant, an oxidant recirculation feedback loop 15 is provided. Recirculation loop 15 comprises pump 50 which is used to induce oxidant flow though cathode chamber 28, flow splitter 20, and water vapor condenser 30 and associated connecting lines. In the arrangement shown in FIG. 1, condenser 30 along with its associated lines provides the feedback conduit between input portion (at pump 50) and the output portion (at flow splitter 20) of recirculation loop 15. Although shown in the feedback conduit in FIG. 1, condenser 30 can be disposed between cathode chamber 28 and flow splitter 20.

After passing regulator 25, pressurized oxidant comprising gas is fed into the nozzle 51 of pump 50 at a typical pressure of 0.2–0.45 MPa. Gas pump 50 is preferably a jet pump. For recirculation of both fuel in anode side 2 and oxidant in cathode side 1, jet pumps are preferred due to their substantially proportional relation between consumption of recirculation streams and used gases in the fuel cells during the current production. Additional positive characteristics of such pumps as compared to electromechanical pumps include the absence of electrical energy use, high reliability, and essentially unlimited time in operation. Jet pump 50 can be driven entirely by potential energy of the compressed oxygen (e.g. stored in reagent tanks). Although jet pumps are preferred, other pump types may be used with the invention.

Figure 2:
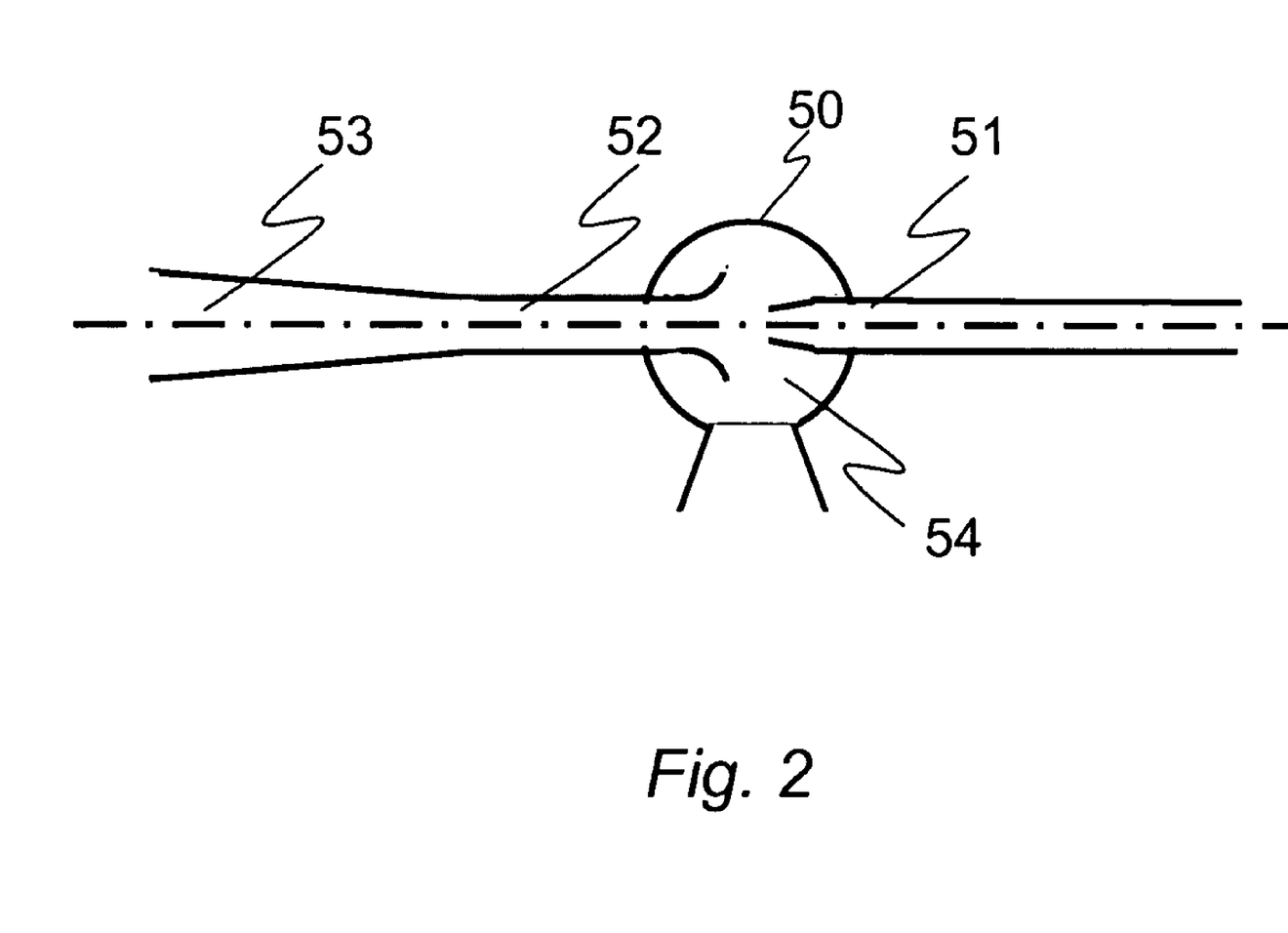
FIG. 2 shows the various components of an exemplary jet pump.

Now referring to FIG. 2, jet pump 50 is shown including various components designed to control pressure/flow characteristics. These include the high-speed gas ejection nozzle 51, a stream mixing chamber 52 with diffuser 53 and a receiving chamber 54 for further gas mixing.

Gas passing through nozzle 51 forms a high-velocity stream in the receiving chamber 54. This high-speed stream generates a lower pressure region at its boundary (according to the Bernoulli principle) and thereby sucks in gas from receiving chamber 54. The two streams of air are directed into the mixing chamber 52 where their speed is equalized due to the mixing. The mixed stream then passes through a diffuser 53, where the stream is expanded, and the static pressure increases.

The coefficient of injection characterizes the ratio between the mixing mass flow of moistened air from the outlet flow from the cathode chamber 28 of the fuel cell 5 in relation to airflow received from compressor 10 via nozzle 51 into air circulation loop. The degree of compression of the mixed airflow output by pump 50 corresponds to aerodynamic resistance of the recirculation loop 15 when oxidant consumption is equal to consumption at the stream pump outlet.

Jet pump 50 is preferably optimized relative to a number of parameters.

The following operational parameters preferably include:
1. the gas pressure at the nozzle inlet 51;
2. the gas pressure in the receiving chamber 54;
3. the coefficient of injection which is equal to ratio between the mass of injected gasses from receiving chamber 54 and the mass of the gasses ejected from stream pump nozzle;
4. the compression ratio of the mixed stream, which is equal to the ratio between pressures of the mixed stream at diffuser outlet 53 and the pressure of the injected stream in the receiving chamber of the pump 54.

Throttling of the air stream occurs by passing the oxidant stream through the valve nozzle 51 of jet pump 50. The pressure regulator 25 then enables stabilizing amount of oxidant gas going through the jet pump 50 in the face of arbitrary changes in oxidant consumption in the fuel cell stack. The optimal upper and lower levels of oxidant (e.g. air) pressure on the cathode can be selected for each specific type of porous media.

Returning again to FIG. 1, after passing pump 50, the oxidant flow is throttled and the pressure preferably drops to between about 0.02–0.05 MPa according to the pressure in the circuit. Heat generated by the fuel cell 100 is shown extracted by an independent coolant loop designated as 61 in FIG. 1. A portion of the oxidant, with depleted oxygen concentration after electrochemical reaction, is directed from an output portion of the recirculation loop 15 into a flow splitter 20, such as a bleed air tee. Flow splitter 20 directs a specific portion or amount of bleed oxidant following electrochemical reaction to expander 11 to use the energy of this flow to help drive the compressor 10 along with main drive motor 12, with the remaining depleted oxygen flow going to condenser 30. Following energy extraction at expander 11, the depleted oxygen flow can be exhausted to the atmosphere.

Water vapor condenser 30 preferably includes two cavities. The first cavity is part of the air recirculation loop 15, and the second cavity is used for coolant circulation to cool the condenser 30 and remove heat and is designated as 62 in FIG. 1. In condenser 30, re-circulated air received from flow splitter 20 saturated with water vapor is cooled and thus condensed. A portion of the water produced from condensation at condenser 30 is removed from air recirculation loop 15 preferably using a water transfer membrane 33 together with a differential pressure regulator 35.

Additional explanation with regard to design of the preferred condenser 30 is now presented. According to the present invention, the condenser has two functions; condensation of water vapor from the air flow exiting cathode chamber 28, and separation of condensed water from the air flow exiting cathode chamber 28 by removing gases including air, even in forms of bubbles. The first function can be performed using a gas/liquid head-exchanger that is cooled, such as by a liquid coolant, for example, with an operating temperature in the range of 30 to 50° C.

The second function of water separation can be performed using a condenser equipped with porous hydrophilic membrane 33, through which condensed water can pass, but not air or other gases. A suitable porous membrane preferably has high corrosion resistance and is able to conduct water through at the rate of water vapor condensation that occurs at maximum external load. A differential pressure regulator 35 of the upstream type is preferably installed at the water outlet from condenser 30. Regulator 35 compares the air pressure in the condenser 30 with the water pressure after the membrane 33, and thus controls the differential pressure across the membrane 33. Control of the differential pressure across the membrane controls the pressure drop on the membrane, which if too high can cause membrane 33 pores to lose the ability to absorb water.

As noted above, a portion of the water from the condenser 30 is directed to pressure regulator 35 which is then extracted from oxidant recirculation loop 15. The differential pressure regulator 35 preferably has sensing elements, such as a diaphragm, in contact with two sources of pressure. The reference side is connected to air recirculation loop of the condenser 30 outlet or inlet flow and the other side is connected with the condenser located after the separating membrane 33. The regulator 35 can activate the pressure control valve located after condenser membrane using a tensile spring connected to regulator's sensing element (e.g. diaphragm). The regulator 35 is preferably adjusted to maintain a pressure differential across membrane 33 of about 0.02±0.005 MPa.

Now turning to anode side 2 of the system 100, anode side 2 provides fuel, such as hydrogen along with humidification to anode 31 of fuel cell 5. Anode side 2 is provided a suitable source of hydrogen or other fuel, preferably being a filtered source, such as from a pressure vessel. Hydrogen supplied first reaches solenoid valve 74 and then pressure regulator 75. Regulator 75 is connected by piping to a pump 55, such as a jet pump having nozzle 57, which acts as to induce hydrogen flow in the closed recirculation loop 60. Hydrogen recirculation loop 60 includes pump 55, anode chamber 38, hydrogen evaporator/humidifier 80, and associated tubing. The hydrogen recirculation loop 60 is a part of the fuel and water vapor supply system for the anode 31. It also provides for extraction of excess water developed in fuel cell 30 as a result of the electrochemical reaction.

According to a preferred embodiment of the invention, the anode chamber 38 of fuel cell 30 has baffles in the hydrogen feed stream that direct the hydrogen flow in such way so as to distribute it uniformly over the anode operating surface. Such distribution is preferably optimized for different anode sizes and geometrical forms.

As noted above, regulator 75 is communicably connected to regulator 25 in cathode side 1. Although a wired connection is shown in FIG. 1, those having ordinary skill in the art will recognize that the connection of regulators 75 and 25 can be over the air or via a pneumatic line as well. For example, the controlling set point of the regulator 75 can be used as a reference point for the regulator 25. Such a connection between fuel regulator 75 and regulator 25 in the air recirculation circuit 15 provides synchronization of their operation. When regulators 25 and 75 are pressure sensor controlled two position pressure regulators, air pressure pulsations in the cathode chamber 28 and hydrogen pressure pulsations in the anode chamber 38 become synchronized.

Two-sided and simultaneous (relative to the polymer membrane 29 in fuel cell 5) control of pressure on anode 31 and cathode 27 is important in the operation of the anode 31, membrane 29, and cathode 27 as a group. This arrangement improves the dynamic performance of fuel cell 5 during load variations and also decreases the degradation rate of volt-ampere characteristics of the fuel cell stack, due to the active anode and cathode ventilation to remove inert gases and provide for more uniform concentration of the electrolyte due to control of water.

Pump 55 is shown as a jet pump analogous to the jet pump 50 described with respect to cathode side 1, while regulator 75 is preferably a regulator analogous to the preferred embodiment of regulator 25 shown in FIG. 1, being the "pressure sensor+ controlled two-positional pressure regulator" type. Jet pump 55 receives hydrogen supplied via regulator 75 (when open) which is provided to nozzle 57. Pump 55 mixes hydrogen supplied by regulator 75 (when open) with recirculated humidified hydrogen flow provided by evaporator 80. The mixed hydrogen stream emerges from pump 55 and reaches anode 31 of fuel cell 5. Regulator 75 preferably senses pressure along an output portion, such as in fluid connection with T-point 84 of the fuel flow network as shown in FIG. 1.

Evaporator 80 is disposed within the hydrogen recirculation loop 60 between inlet and outlet portions to introduce water vapor into the hydrogen flow stream provided to anode 31. Although shown in the feedback conduit in FIG. 1, evaporator 80 can be disposed between anode chamber 38 and T-point 84. Evaporator 80 shown in FIG. 1 includes a porous water wick 81, and a water collection cavity-base device 82 to remove excess water from the evaporator 80. Evaporator 80 is designed to act as a fluid/gas heat exchanger. A temperature control system 93 circulates fluid medium through lines 90 and 91 to maintain the specified temperature conditions for evaporator 80.

Water from condenser 30 on the cathode side 1 via pressure regulator 35 installed on water outlet of condenser 30 in the oxidant loop 15 is in fluid connection with evaporator 80 via line 95. Water from condenser 30 is preferably introduced to the upper portion of evaporator 80 near wick 81. This configuration provides water vapor and hydrogen flow to the anodes in relation to the external electrical load. Specifically, the higher the load on fuel cell 30, the higher the hydrogen flow and oxidant flow provided by regulators 75 and 25 respectively, the more water is produced, which in turn transfers more water from cathode side 1 to evaporator 80 via line 95 which humidifies the increased hydrogen flow. Thus, water and hydrogen flow to anode 31 is supplied in relation to the external electrical load.

Important in the operation of hydrogen-air and related fuel cells with proton exchange membranes is the process of uniformly supplying water in addition to hydrogen to the "tri-surface" area of the anodes. According to the schematic of the cathode side 1 of an exemplary fuel cell 5 shown in FIG. 1, pressure regulator 35 provides humidification for fuel recirculation loop 60 for supply to anode 31.

Water balance produced in the fuel cell 5 under load can be characterized by the following equations:

$$MH_2O = m1 + m2 + m3$$

where $MH_2O$ is the water produced in the fuel cell 30 during the current generating process as a result of the reaction combining hydrogen and oxygen in the air, and $$MH_2O = f(Nu + Ni),$$

where:

Nu is the useful power output of the electrochemical generator, equal to the external electrical load; Ni is the power used for the internal needs of the fuel cell system 100, such as for driving the air compressor 10 drive, coolant pump motors, temperature regulators and electrically operated valves. m1 is the mass of the water extracted from hydrogen recirculation loop evaporator 80 or dumped from the fuel cell 5 into the atmosphere; m2 is the mass of the water released in vapor form into atmosphere along with exhausted air from air recirculation loop 15 and air compressor expander 11; and m3 is the mass of the water transferred from the air recirculation loop condenser 30 to the hydrogen recirculation loop evaporator 80.

Operation of the dual loop system 100 as described above can be characterized by two equations, relating the relative temperature levels of its major components:

$$Tfcs > Te > Tc$$

Where:

Tfcs is the temperature of operating gases in the air recirculation loop 15 at the flow outlet of the fuel cell 30;

Te is the temperature ($H_2 + H_2Ov$) of the flow at the evaporator 80 outlet;

Tc is the temperature (Air–$H_2O$) of flow in the air recirculation loop 15 at the condenser 30 outlet.

Furthermore, relative pressure levels between anode 38 and cathode chamber 28 are as follows:

$$Pa \geq Ph + \Delta P + 0.005 \text{ MPa},$$

Where:

Pa is the air and water vapor pressure in the oxidant recirculation loop 15;

Ph is the hydrogen and water vapor pressure in the hydrogen recirculation loop 60; and $\Delta P$ is the pressure drop across the condenser 30 separating membrane 33 controlled by regulator 35.

Individual temperature regulators well known in the art installed on each controlling device can control temperature levels Tfcs, Te and Tc, for example. Temperature sensors for these temperature regulators can be installed in coolant flow circulating through the fuel cell stack evaporator 80 and condenser 30.

To extract surplus water from evaporator 80, a liquid transport membrane 83 and water collection cavity-based device 82 are preferably included in system 100. In the evaporator cavity is also preferably installed a hydro-membrane with selective water permeability 83, analogous to separator 33 in the oxidant loop, which separates liquid water from gas. The lower part of evaporator 80 is fitted with water collection cavity-based device 82, which stores excess water not vaporized into the circulating hydrogen stream. The outer part of the separating membrane is connected to a water extraction line via a back-pressure regulator 85, which controls the pressure drop on membrane 83 to, for example, 0.025–0.005 MPa. This figure is preferably optimized based on system parameters including the membrane material and capillary sizes. After the regulator 85, water from fuel cell can be exhausted into atmosphere or collected in an accumulator vessel.

At the hydrogen flow outlet of the fuel cell 5 at T-point 84, a purge line for the anode chamber 38 is preferably connected with a throttle 87 to restrict hydrogen flow when solenoid valve 88 is fully open.

Figure 3:
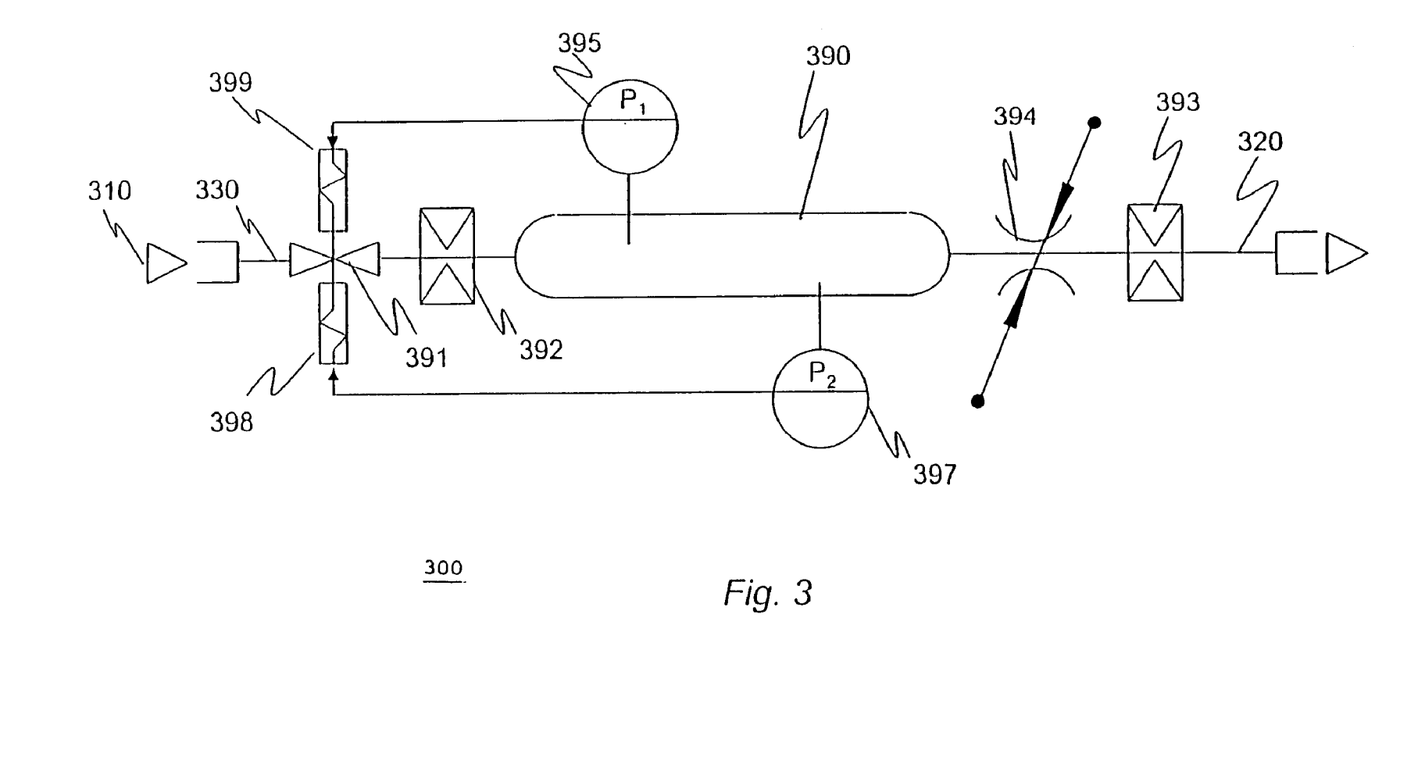
FIG. 3 is a schematic model showing elements of an exemplary regulated gas supply system comprising a closed vessel with variable gas inflow, consumption and outlet flow.

FIG. 3 shows a schematic model of elements of an exemplary regulated gas supply system comprising a closed vessel with variable gas inflow, consumption and outlet flow. As noted above, pressure regulators 25 and 75 are preferably of the type "pressure sensor-controlled two-positional pressure regulator". System 300 is a model for gas supply using such a regulator to a fuel cell with variable consumption in response to the speed of a chemical or electrochemical reaction.

A gas (pressurized air for example) from a source 310 is modeled as having an infinite volume and pressure. For example, the pressure provided $P_1 = 0.5$ MPa can be introduced into the vessel 390 via pipe 330 which has a two-position pressure regulator 391 including two solenoids, namely 399 to open and 398 to close. Assume that pressure in the vessel 390 is desired to be maintained at a stable level, such as $P_{work} = 0.3 \pm 0.03$ MPa.

A regulation throttle 392 is installed between pressure regulator 391 and the vessel 390 for restriction of gas flow. Gas flows through pipe 320 which has a non-regulated throttle 393 to restrict exiting gas flow and a controlling throttle 394, which reduces gas flow in pipe 320. On vessel 390, pressure sensors 395 and 397 are installed with different pressure regulating parameters to operate solenoids 399 and 398, respectively.

Design of the two-position pressure regulator 391 allows only two extreme positions of the valve and saddle, "fully open" and "fully closed." Any intermediate positions of the valve relative to the saddle are not possible. Throttling of the gas stream entering the vessel 390 occurs only at the throttle 392. Gas can exit the vessel only through the pipe 320 at a variable flow rate controlled by the flow area changing of the regulating throttle 394. Maximum consumption of the effluent gas through the pipe 320 is limited by the flow area of the unregulated throttle 393. It is assumed that the maximum gas inflow rate to the vessel through the pipe 330 is 1.5 times the maximum gas consumption from the vessel through the pipe 320.

The object of system 300 is to control of the pressure in the vessel 390 under conditions of variable gas effluent rates from the vessel. Two pressure sensors 395 and 397 are installed on the vessel 390. If the pressure is lower than some pre-determined level (for instance, $P_{work} = 0.275$ MPa) the first pressure sensor 395 will command the pressure regulator 391 to open. If the pressure is higher than some pre-determined level (for instance, $P_{work} = 0.320$ MPa) the second pressure sensor 397 will command the pressure regulator 391 to close. As a result, system 300 delivers discrete pulses of gas at a constant pressure to vessel 390.

In conventional solutions to this problem, a "balanced-type" pressure regulator controls the gas supply to the fuel cell. The "balanced-type" pressure regulator in such a circuit has a measuring space directly after the valve saddle and throttling of the gas pressure occurs in the gap between the valve and saddle. Such regulators can replace both pressure sensors 395 and 397 and the two-position regulator 391.

Figure 4A:
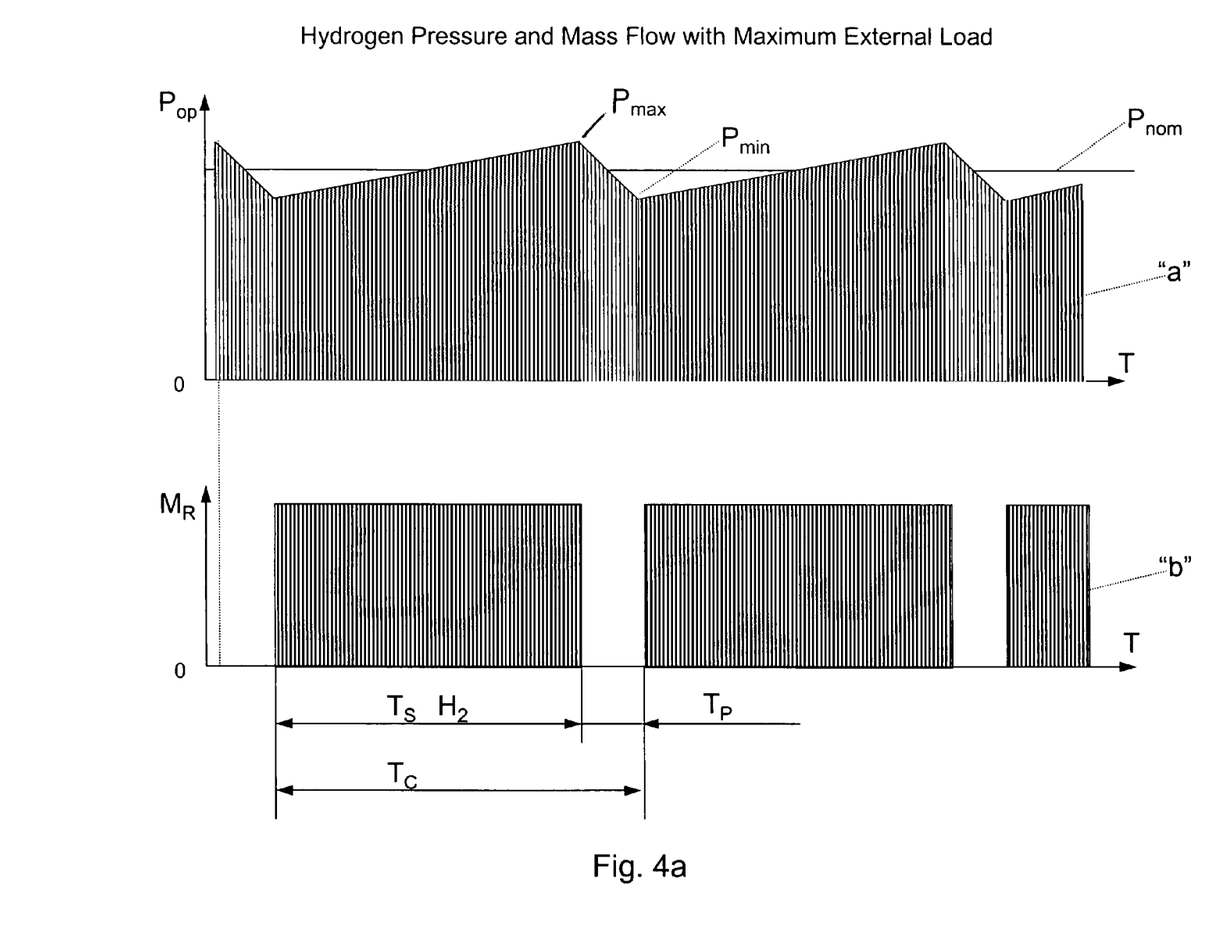
FIGS. 4(a), (b) and (c) show examples of gas supply periods, pauses and cycles of an aperiodic load based reagent flow supply arrangement under relatively high, intermediate and low external load conditions, respectively, according to a preferred embodiment of the invention.
Figure 4B:
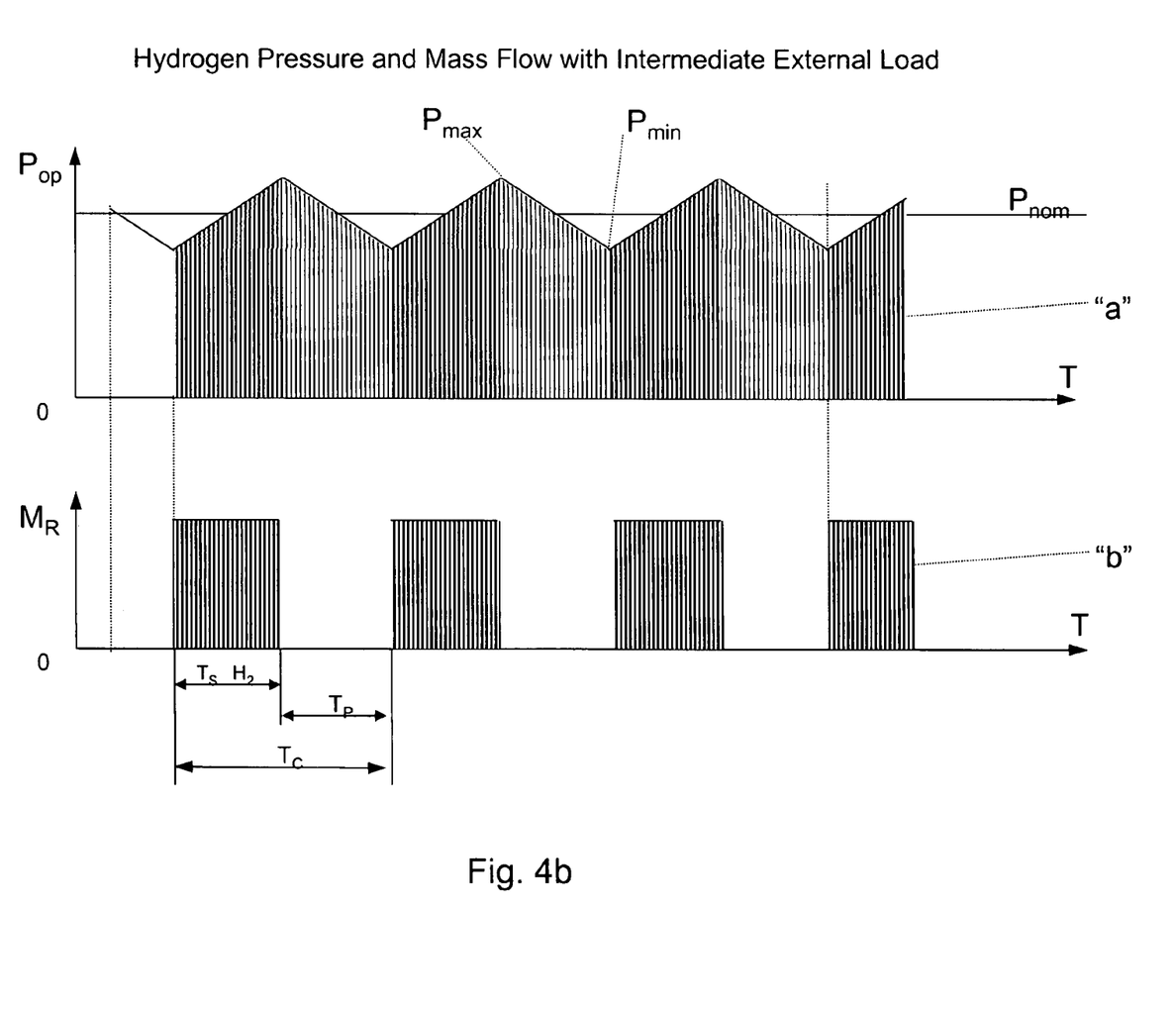
Figure 4C:
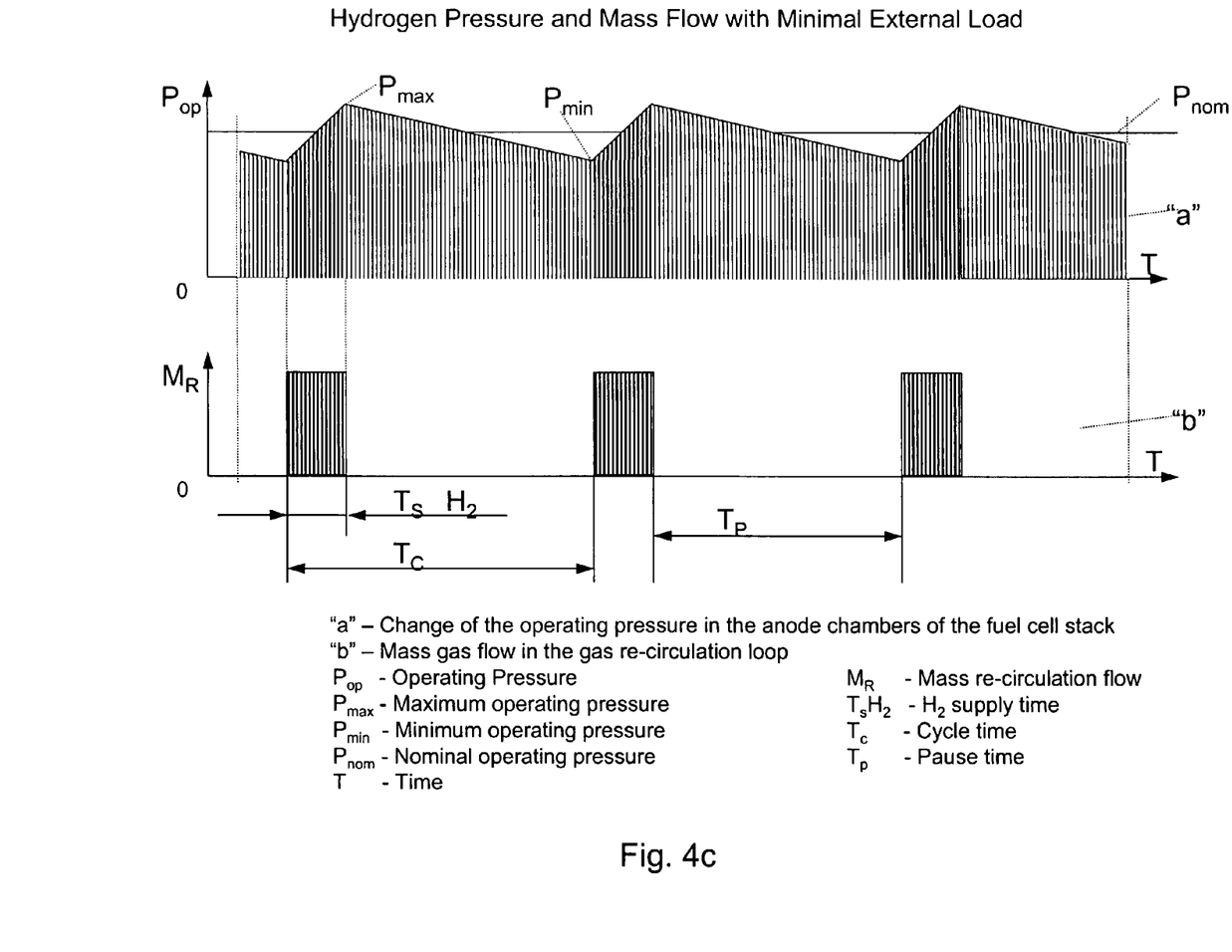

FIGS. 4(a), (b) and (c) show exemplary gas supply periods, pauses and cycles of an aperiodic load based reagent flow supply arrangement under relatively high, intermediate and low external load conditions, respectively, according to a preferred embodiment of the invention for a fixed period of time, $T_1$. Pop is the operating pressure, Pmax is the maximum operating pressure, Pmin is the minimum operating pressure, Pnom is the nominal operating pressure, T is the time, $M_R$ is the mass circulation flow, Ts is the hydrogen supply time, Tc is the cycle time and $T_P$ is the pause time. To implement pauses and cycles of an aperiodic load based reagent flow a relay-type of pressure regulator can be used. This preferred regulator has two positions, fully open and fully closed. In this preferred embodiment, a pressure sensor– controlled two-positional pressure regulator, or arrangement which provides equivalent flow dynamics responsive to system dynamics, is used for regulators 25 and 75.

Regulators 25 and 75 may be designed so that its valve is connected with a sensing diaphragm element, which enables free additional valve shift along the stream axis relative to a saddle of the valve and diaphragm. Due to use of a discrete control element, this type of regulator valve can only be in one of two extreme positions: "fully open" or "fully closed." The discrete element does not allow the valve to remain in an intermediate position relative to the saddle, when the regulator is working in response to proportional throttling of the gas supply through the valve saddle. Such a regulator can be identified by the work regime as a device of the type "pressure sensor+controlled two-positional pressure regulator."

FIG. 4(a) shows the gas supply period, pauses and cycles under relatively high load conditions. Under the high load conditions, the cycle time (Tc) which comprises a supply time (Ts) plus the pause time (Tp) provides a little over two (2) periods in the time $T_1$. The supply time (Ts) is nearly equal to the cycle time (Tc). When the regulator is open the operating pressure (Pop) rises as a function of time until the time when Pop reaches Pmax, then the regulator shuts off. While the regulator is off, the operating pressure decreases until $P_{Min}$ is reached, and the regulator is turned on again. FIG. 4(b) shows the gas supply period, pauses and cycles under moderate load conditions. Under the moderate load conditions, almost five cycles are provided in the time $T_1$, while the supply time Ts is about 0.5 Tc. Finally, FIG. 4(c) shows the gas supply period, pauses and cycles under relatively low load conditions. Under the low load conditions, about three cycles are provided in the time $T_1$, while supply time Ts is about 0.2 Tc.

Compiling the data from FIGS. 4(a)–(c), the supply time Ts increases as the load increases. In addition, the mass recirculation flow $M_R$ increases with increasing load.

Thus, the preferred pressure sensor–controlled two-positional pressure regulator" can be characterized as a pulse gas supply and recirculation where the pulse dynamics change as a function of load. A difference between the reactant flow characteristics obtained using the preferred pressure regulator as disclosed herein as compared to pulsed reactant systems such as disclosed in U.S. Pat. No. 6,093,502 to Carlstrom, Jr. et al. is the simultaneous variation of pulse width and pulse period in relation to the external load and gas consumption rate of the electrochemical reaction provided by the invention. In addition, Carlstrom's pulsed system is only activated upon detection of a predetermined high load level, while the pulsed gas supply of the invention is preferably operable over all load conditions.

Again returning to FIG. 1, assuming regulator 75 is the type "pressure sensor+controlled two-positional solenoid valve," or a device which provides an equivalent response, which turns on when the pressure at 84 reaches PMin, and turns off when the pressure at 84 reaches Pmax. When regulator 75 is fully open, gas flows through, such as into the input portion of the recirculation loop 60 through pump 55, thus raising the operating pressure in loop 60. When regulator 75 is fully closed, thus pausing the gas supply provided to loop 60, then pressure in the loop 60 begins dropping until Pmin is reached, this pressure value is sensed, and as a result regulator 75 again turns on and a new cycle is initiated. In its fully closed position, the pressure upstream from jet pump nozzle 57 is reduced synchronously with the pressure in the recirculation loop 60, because gas volume between regulator 75 and nozzle 57 is much smaller then gas volume in the recirculation loop 60 and these two volumes are interconnected. During opening of the valve in regulator 75 the pressure downstream from it and before jet pump nozzle 57 is rises rapidly to the regulator's inlet pressure due to the discrete valve opening and difference (more then about 10 times) between valve cross section flow versus nozzle cross section.

When pressure in the recirculation loop 60 is increased then Pmax is reached, sensed, and the valve of regulator 75 is also closed rapidly. To minimize gas flow throttling on the pressure regulator, its full-open cross section and jet pump nozzle cross section should be calculated accordingly.

The invention provides numerous advantages over available fuel cell systems. For example, advantages of the invention include:

1) Increased air feed rate along the cathode working surface, due to the increasing amount of the air supplied to the each point provided by recirculation loop 15. This results in better control of oxidant feed by the air recirculation loop 15 to the "tri-surface" cathode area. In operation, the pressure in the cathode chamber 28 is at lower pressure levels than those disclosed fuel cell devices where air is fed straight through without recirculation. Lower pressure results because of the higher flow speed provided for the required mass flow. Increased speed leads to increased active ventilation of cathode pores and surfaces and improved oxygen supply to the operating cathodes. Implementation of the oxidant supply design according to the present invention can increase the rate of oxygen use by the cathode by a factor of 2.5 to 3.5. This increase is equivalent to the increasing the cathode working pressure by about 1.6–1.9 times.

2) Highly uniform water distribution and efficient water removal from the cathode surface. Improved humidification of air entering the cathode chamber 28 results in improved water concentration uniformity along the cathode, especially at in the gas inlet and outlet regions. This advantage is primarily due to the mixing of the air mass flow at higher temperature and lower humidity from the compressor with the humidified air mass flow at lower temperature from the regulation loop, for example in the proportion of 1:3. This advantage results in a significant reduction in the risk of fire or explosion in the fuel cell due to the decrease in the risk of "overdrying" at the inlet section of cathode. It should also be noted that at a certain level of excess air pressure on the cathode as compared with the hydrogen pressure on the anode can result in air leaking onto the anode if the hermetic seal of the membrane is not maintained. When this occurs, a catalytic interaction occurs resulting in water formation. Such a situation does not increase the risk of fire however.

3) More effective water vapor supply to the entire anode surface is provided. This advantage is due to the continuous circulation of the humidified hydrogen through the anode chambers.

4) Equalization of electrolyte concentration over cathode surface by reducing temperature of the air flow at the inlet area of cathode 27 and inducement of vaporization by the outlet air flow along the cathode 27. Since a portion of the air supplied to cathodes is recirculated air, intake air requires less compression, and as a result is the temperature of the air supplied to cathodes is lower (and as a result moister) as compared to a conventional fuel cell system.

5) Reduced risk of membrane dehydration thus increasing the electrochemical performance of the membrane assembly is also provided. This advantage results because of the anode and/or cathode active surface limitation.

6) Pulsation of the working (operating) pressure at the three-phase cathode interface (gas, catalysts and electrolyte) is a significant advantage, since active ventilation of the pores occurs and, as a result, nitrogen (as a passive component of air) is rapidly removed from the active surface of catalysts. Pressure pulsation in gas-transport pores of the cathode results in a significant decrease of the "nitrogen cover" effect. This effect occurs when nitrogen is pressed to the catalysts surface by the air passing along the three-phase interface through the gas-transport pores.

Significant advantages under rapid changes in load over a wide range are provided by the invention. At the same conditions of pressure, temperature and air supply from compressor, the magnitude of the voltage variations during transit to a new steady state load decreases by a factor of about 1.5 to 2.2.

The pulsating cathode and anode gas feed system of the invention also provides significant advantages for preparing a fuel cell stack for start-up after a period of storage. Upon shut down, the fuel cell consumes oxygen fully from air before completely stopping. After long intervals between operation, days or weeks for example, re-start can be hindered because the active boundary between cathode and anode is in the state of nitrogen blockade. That is, access of the components to the three-phase interface is difficult due to the filling of gas-transport pores (in the cathode, for example) by nitrogen. The pressure pulsation aspect of invention addresses this problem by greatly improving the process of starting electrochemical generator after downtime or storage.

The invention thus significantly increases the reliability and lifetime of the electrochemical generator. The improvements of this invention enable the use of PEM fuel cell stacks as electrochemical generators for both mobile and stationary power units that are able to efficiently respond to rapidly cycling load conditions.

While various embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A PEM fuel cell system, comprising:
   a membrane/electrode assembly (MEA) including a proton exchange membrane (polymer electrolyte membrane, PEM) between an anode chamber with an anode and a cathode chamber with a cathode;
   a hydrogen supply network connected to supply hydrogen fuel to said anode, said hydrogen supply network having:
      a fuel jet pump with an inducing nozzle and a suction input communicating with an anode output of said anode chamber;
      a two-position pulse-generating hydrogen supply pressure regulator having a hydrogen input and a hydrogen output communicating with said inducing nozzle of said fuel jet pump, feeding an anode fuel recirculation loop;
      a hydrogen supply communicating with said hydrogen input of said pressure regulator;
         wherein said regulator has a first, at least substantially closed position and a second, at least substantially open position for feeding hydrogen to an input of said anode chamber with pulse-fluctuating pressure; and
         wherein a duration of a cycle and a duration of a pulse within the cycle are variable in dependence on a magnitude of a fuel cell output requirement and the duration of the cycle and the duration of the pulse change under control of said regulator;
   an air supply network connected to supply air to said cathode, said air supply network having:
      an air jet pump with an input receiving air from an air supply compressor and a suction input communicating with a cathode output of said cathode chamber;
      a differential air supply regulator having an input area communicating with said air supply and an output area communicating with an inducing nozzle of said air jet pump; and
   a connection between said air supply regulator and said hydrogen supply pressure regulator for synchronizing pressure and flow pulses of the cathode air supply with pressure and flow pulses of the anode fuel supply.

2. The fuel cell system according to claim 1, wherein said air supply network includes a feedback connection between said air jet pump and a cathode output of said cathode chamber, forming a recirculation loop of said air supply network.

3. The fuel cell system according to claim 1, wherein said hydrogen supply pressure regulator has a master measuring chamber communicating via a feedback line in the hydrogen recirculation loop and said air supply regulator forms a slave to said hydrogen supply pressure regulator, for synchronizing the pressure and flow pulses at said anode with the pressure and flow pulses at said cathode.

4. A PEM fuel-cell system, comprising:
   an ion-exchange membrane interposed between an anode and cathode to form a membrane/electrode assembly (MEA), said MEA interposed between a fuel gas diffusion layer and an air diffusion layer;
   an air flow network in fluid connection with said air diffusion layer, said air flow network having an input portion for supplying air and an output portion for removing said air after electrochemical reaction, wherein said air flow network includes a feedback conduit to form an air recirculation loop, said air recirculation loop feeding back an additional amount of feedback air with a reduced oxygen content due to oxygen consumption during the electrochemical reaction, from an output of said cathode to said air input portion, and adding the amount of feedback air into the input portion to increase a total volume of air flow; and
   a fuel flow network in fluid connection with said fuel gas diffusion layer, said fuel flow network having an input portion for supplying hydrogen, an output portion for removing said hydrogen after said electrochemical reaction, and a feedback conduit to form a fuel recirculation loop, said fuel recirculation loop feeding back a portion of said fuel after said electrochemical reaction to said fuel input portion;
   said air input nortion including an air jet pump and said fuel input portion including a fuel jet pump therein, said air and fuel jet pumps inducing recirculation in said air and fuel recirculation loops substantially exclusively from potential energy provided by said air supplied and said fuel supplied, respectivel; a network pressure-controlled two-position pulse pressure regulator disposed in said fuel network having a first, fully open position and a second, fully closed position, said fuel pulse pressure reculator having an input receiving said supply fuel and an output coupled to said fuel jet pump, said fuel pulse pressure regulator generating discrete pulses of fuel flow having a pulse duration increasing with an electrical load imposed on said fuel cell.

5. The fuel cell according to claim 4, wherein an output flow of said feedback conduit is an input flow to said jet pump, said jet pump mixing said portion of said fuel or air fed back with externally supplied fuel or air.

6. The fuel cell according to claim 4, further comprising a pressure regulator in said air flow network, said pressure regulator being an air differential proportional with two measuring chambers, said pressure regulator having an input receiving the supply air and an output coupled to said air jet pump, said pressure regulator generating discrete pulses of air flow and pressure synchronized with pulses of fuel flow and pressure in said fuel flow network.

7. The fuel cell according to claim 6, wherein said fuel pulse pressure regulator and said air pulse pressure regulator are communicably connected, said discrete air and fuel pulses being synchronized in time.

8. The fuel cell according to claim 6, wherein a fuel pressure setpoint on said fuel pulse regulator is used as a reference pressure setpoint for said air pulse regulator, whereby said air pulse regulator is a slave regulator.

* * * * *